United States Patent [19]

Liu et al.

[11] 4,048,587
[45] Sept. 13, 1977

[54] BISMUTH HALIDE VAPOR LASER

[75] Inventors: Chi-sheng Liu, Monroeville; Lelland A. C. Weaver, Pittsburgh, both of Pa.

[73] Assignee: Westinghouse Electric Corporation, Pittsburgh, Pa.

[21] Appl. No.: 703,739

[22] Filed: July 9, 1976

[51] Int. Cl.² .............................................. H01S 3/00
[52] U.S. Cl. .......................... 331/94.5 G; 331/945 PE
[58] Field of Search .................. 331/94.5 G, 94.5 PE; 330/4.3

[56] References Cited

U.S. PATENT DOCUMENTS

| 3,576,500 | 4/1971 | Gould | 331/94.5 |
|---|---|---|---|
| 3,934,211 | 1/1976 | Lucov et al. | 331/94.5 G |
| 3,936,772 | 2/1976 | Lucov et al. | 331/94.5 G |

Primary Examiner—Martin H. Edlow
Attorney, Agent, or Firm—M. P. Lynch

[57] ABSTRACT

The low temperature operation, i.e., between 300° and 500° C, of a bismuth halide vapor laser avoids the formation of the metal dimer $Bi_2$, the occurrence of which in the operation of a pure bismuth laser significantly reduces the gain and stimulated output due to absorption of the laser energy. The successful operation of a bismuth halide laser provides the basis for developing a laser operating in the underwater transmission band of between 4,700 and 4,800 Angstroms which lies near the minimum of the sea water absorption scattering curve thus rendering it a prime candidate for underwater applications.

7 Claims, 2 Drawing Figures

BISMUTH HALIDE VAPOR LASER

BACKGROUND OF THE INVENTION

The concept of producing pulsed metal vapor laser transitions by placing a metal halide of the desired metal within an enclosure and vaporizing the metal halide to provide a metal halide vapor is described in detail in U.S. Pat. No. 3,934,211, issued Jan. 20, 1976, entitled "Metal Halide Vapor Laser", and assigned to the assignee of the present invention. This U.S. patent is incorporated herein by reference. There is further disclosed in U.S. Pat. No. 3,936,772 issued Feb. 3, 1976, entitled "High Flow Metal Halide Vapor Laser", a technique for obtaining high pulse rate metal vapor laser transitions. This latter patent is assigned to the assignee of the present invention and is also incorporated herein by reference.

In accordance with the above-identified U.S. Pat. No. 3,934,211, the metal halide vapor thus produced is thereafter disassociated to provide ground state metal atoms of sufficient number density to create a condition for resonance trapping and substantially simultaneously therewith, ground state metal atoms are excited to an upper laser level, while maintaining a sufficient number in the ground state to preserve the resonance radiation trapping condition, with electrons sufficiently energized to create a population inversion between the upper and lower laser level. The excited metal atom is permitted to emit laser radiation by stimulated emission to a lower laser level and the emission is radiated, preferably between a pair of externally mounted mirrors. The metal atom is permitted to relax from the lower laser level to the ground state and the aforementioned steps are repeated. U.S. Pat. No. 3,934,211 identifies as well known the metal vapor lasers of copper, manganese, and lead.

As disclosed in U.S. Pat. No. 3,934,211, it was determined that the metal component of a metal halide molecule can be made to lase at temperatures substantially below those required for pure metal vapors. It was further determined that thermal energy at or below those normally employed in pure metal vapor lasers do not provide adequate atomic densitites and, therefore, it is necessary to provide collisional excitation energy with energetic electrons to obtain dissociation of the molecular vapors.

While pure copper, lead, and manganese readily exhibited the operational characteristics of desired metal vapor laser transitions, thus rendering them prime candidates for modification to produce corresponding metal halide vapor lasers suitable for operation at lower temperatures, attempts to achieve pure bismuth metal vapor laser transitions proved unsuccessful. The lack of success of achieving successful operation of a pure bismuth metal laser is attributed primarily to the fact that the metal dimer, or diatomic molecule, $Bi_2$ is formed by the pure bismuth metal laser and the metal dimer $Bi_2$ absorbs substantial laser energy at the preferred underwater transmission wavelength of 4722 Angstrom thereby destroying the laser gain required to support the stimulated laser output.

The use of pure bismuth vapor to produce laser action at 4722 Angstroms has been unsuccessful to date because of a fundamental problem in bismuth volatilization, namely the formation of the diatomic molecule $Bi_2$ in the vapor in addition to atomic Bi. For instance, at 1200° K the ratio of molecular $Bi_2$ to atomic Bi vapor pressure is about 1 to 3. Thus at the temperatures required to achieve even the minimum Bi densities for laser action, greater than 25% of the particles are in the molecular form. These molecules absorb electrical excitation energy at the 4722 Angstrom atomic radiation, thus rendering pure bismuth metal a poor candidate for lasing.

Inasmuch as the pure bismuth metal laser failed to achieve the operational status of the pure copper, manganese, and lead lasers, it has been generally concluded that the lower operating temperature benefits realized by the addition of metal halide molecules as taught by U.S. Pat. No. 3,934,211 was of no benefit to the pure bismuth laser.

SUMMARY OF THE INVENTION

Detailed studies of the operation of bismuth halide lasers resulted in strong emissions at 4722 Angstroms from fast pulse discharges in bismuth iodide, $BiI_3$, vapors at 325° C. The testing of this bismuth halide formed by the combination of the pure bismuth metal and iodide as the metal halide molecule substantiated the conclusion that the upper laser level $7s^4P_{1/2}$ of Bi can be efficiently excited in a $BiI_3$ vapor by electron impact excitation. Furthermore, it was observed that only the radiation lines of Bi were present in fluorescence between 2800 Angstroms and 6000 Angstroms thereby indicating that the diatomic molecule $Bi_2$ was neither present nor excited in the discharges.

The absence of the metal dimer or diatomic molecule $Bi_2$ in the evaluation of bismuth halide lasers including $BiI_3$, $BiBr_3$, and $BiCl_3$ supports the previously unexpected conclusion that practical useful lasers can be developed through the use of bismuth halide metal vapors even though the pure bismuth metal vapor is ineffective as a practical lasing composition.

BRIEF DESCRIPTION OF THE DRAWINGS

The invention will become more readily apparent from the following exemplary description in connection with the accompanying drawings.

DESCRIPTION OF THE PREFERRED EMBODIMENT

While the above referenced U.S. Patents describe in detail the logical extension of operative pure metal vapor lasers to that of a metal halide vapor laser to permit lower temperature operation, the inability to successfully achieve lasing with a pure bismuth vapor laser, due to the adverse energy absorption by diatomic molecule $Bi_2$, has essentially eliminated consideration of a bismuth halide lasing composition.

The invention disclosed herein documents detailed studies of the characteristics of a bismuth halide vapor laser with the conclusion being that the operation of a bismuth halide vapor laser consistent with the teachings and structures of U.S. Pat. No. 3,934,211, which is incorporated herein by reference, does indeed effect desired lasing action while avoiding the formation of the diatomic molecule $Bi_2$.

It has been observed experimentally that the vaporizing or heating of a solid bismuth halide composition, such as $BiBr_3(s)$ produces the gaseous bismuth halide composition $BiBr_3(g)$ and does not produce the elemental constituents Bi and Br. Inasmuch as substantially all the bismuth is contained in the gaseous composition $BiBr_3(g)$, the bismuth vapor pressure is low, thus supporting a conclusion that the diatomic molecule $Bi_2$ is not present. The absence of the diatomic molecule $Bi_2$ eliminates the adverse energy absorption factor which has rendered the pure bismuth vapor laser inoperative. Similar results, namely the generation of a gaseous bismuth halide composition free of the diatomic molecule $Bi_2$ has been achieved by heating solid bismuth halide compositions including $BiI_3$ and $BiCl_3$.

Figure 1:
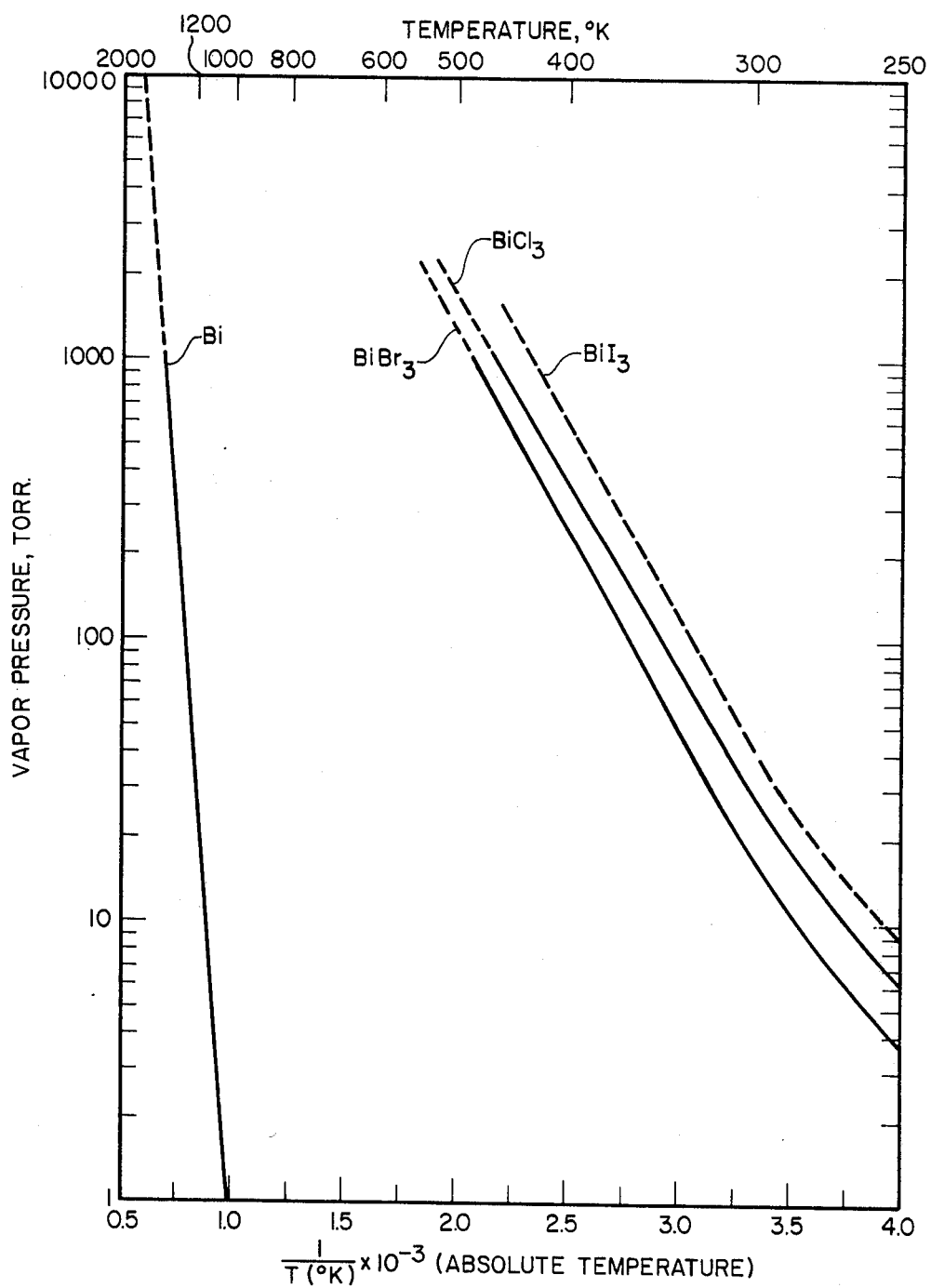
FIG. 1 is a plot of bismuth and bismuth halide vapor curves.

The contrast between the vapor pressures of pure bismuth and bismuth halides is apparent from the curves of FIG. 1 wherein the bismuth halides have vapor pressures approximately 10 Torr at 250° C while the pure bismuth metal exhibits a vapor pressure of approximately 10 Torr at 1100° C.

Of special interest is the pulse shortening observed at the 4722 Angstroms line in $BiBr_3$ and $BiI_3$ pulse discharges. Although this radiation line is very close to the optimum underwater transmission wavelength, laser action for this radiation line has not been previously observed in pure bismuth metal systems due to the formation of the absorbing species represented by the diatomic molecule $Bi_2$. The absence of $Bi_2$ radiation in the bismuth halide discharges indicates that 4722 Angstrom laser action is available from the bismuth halide vapor laser despite the fact a pure bismuth metal laser is inoperative. Results of these studies and observations further supports the observation that other metal laser systems not operative as a pure metal laser may indeed be operational as a metal halide vapor laser.

Figure 2:
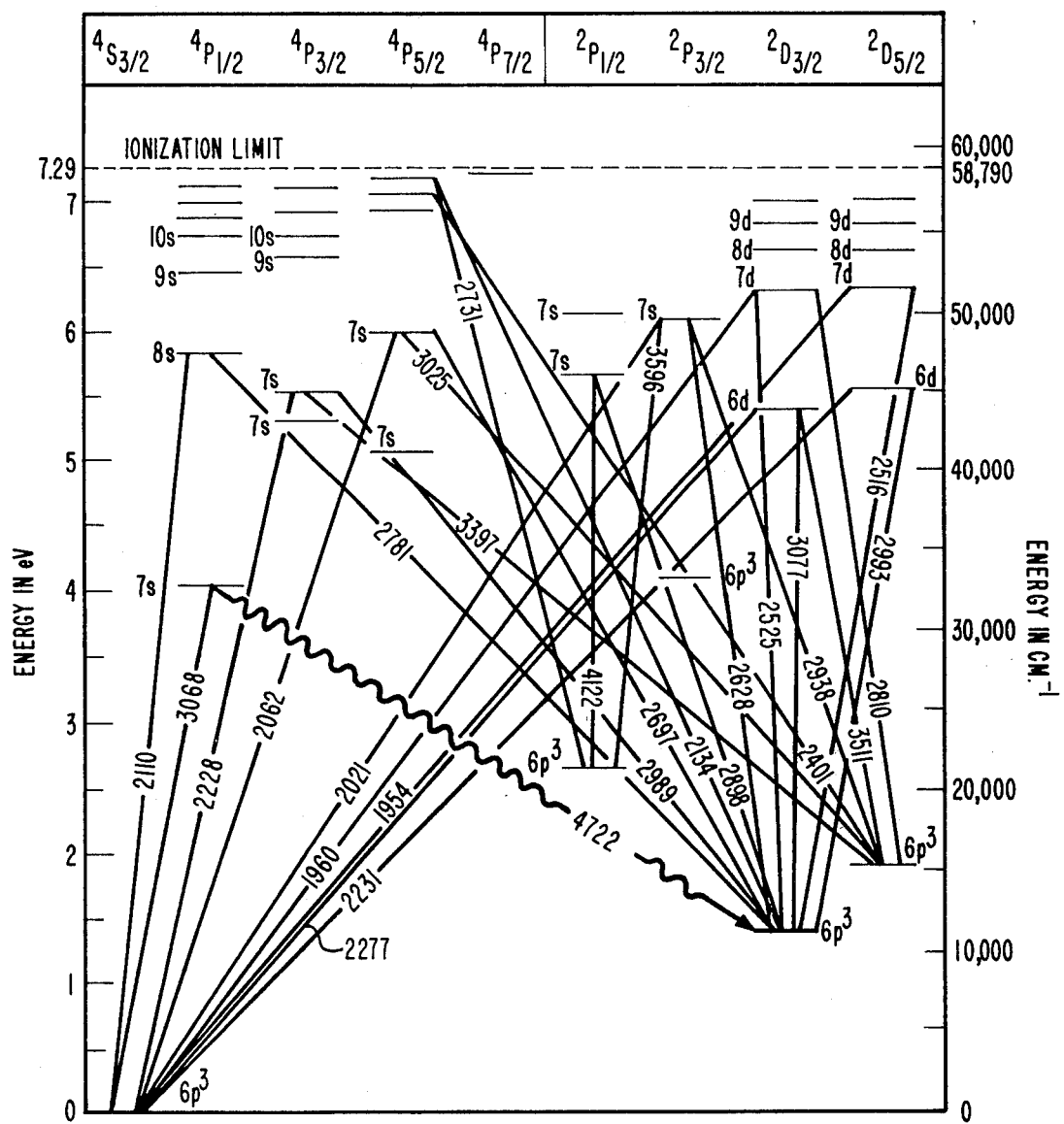
FIG. 2 is a plot of the energy level diagram of the bismuth.

Strong emission at the 4722 Angstrom wavelength has been observed from fast pulse discharges in $BiI_3$ vapors at approximately 325° C. The energy level diagram of FIG. 2 indicates that the upper laser level $7s^4P_{1/2}$ of bismuth can be efficiently excited in a $BiI_3$ vapor by electron impact excitation. Furthermore, only the radiation lines of Bi were observed in fluorescence between 2800 Angstroms and 6000 Angstroms thereby indicating that $Bi_2$ was not present or excited in these discharges. The upper laser level of bismuth is a resonance state which is about 4 eV above the ground state $6p^3\ ^4S_{3/2}$, and the terminal laser level is the metastable state $6p^3\ ^2D_{3/2}$ which is about 1.4 eV above the ground state.

The dissociation energies for the various bismuth halide vapor compositions are approximately 2.5 eV for $BiI_3$, and approximately 3 eV for $BiBr_3$ and $BiCl_3$. Bismuth halide vapors at temperatures below 300° C contain very few free Bi atoms in the absence of electrical dissociation.

The preferred operating temperature for the bismuth halide laser, consistent with the curves of FIG. 1, is between 300° C and 500° C.

During the first few nanoseconds of a pulsed discharge in the bismuth halide vapors, the radiation characteristic is predominantly the bismuth resonance radiation and the radiative lifetime of the upper laser level is determined by the resonance radiation. This lifetime is relatively short, i.e., 2.8 nanoseconds. An imprisonment of the resonance radiation occurs at increased dissociation levels and the upper laser level lifetime is extended to the radiative lifetime of 4722 Angstroms radiation, i.e., approximately 111 nanoseconds. With this extended lifetime, the upper laser level of the bismuth halide vapors can be pumped by conventional fast pulse circuitry. This dissociative excitation by electron impact along with resonance trapping produces a population inversion in the bismuth halide vapor laser consistent with the teachings and disclosure of the copper halide vapor laser of the above-referenced U.S. Pat. No. 3,934,211.

While the above disclosure recognizes the preferred usefulness of the bismuth halide vapor laser at the laser radiation level of 4722 Angstroms for use in underwater applications, it is clearly apparent that all possible lines radiated from the various resonance levels to the metastable levels represent potential laser action. Multiple laser wavelengths can be realized through proper design of an optical cavity system.

A further advantage realized from the use of bismuth halide vapor lasers is that the deposition of pure bismuth on the envelope walls or windows of a laser apparatus following thermal or electrical dissociation can be removed by "scouring" of the bismuth atoms by the halogen particles. Thus the original laser species is recovered and degradation of the optical windows of the laser apparatus due to bismuth condensation can be avoided.

We claim as our invention:

1. In a laser apparatus for obtaining metal vapor laser transitions at temperatures substantially below the metal vaporization temperature, the combination of:
   an enclosure,
   a bismuth halide selected from the group consisting of $BiI_3$, $BiCl_3$ and $BiBr_3$ within said enclosure,
   means for vaporizing said bismuth halide by heating said bismuth halide to a temperature between approximately 300° C and 500° C while avoiding the formation of the metal dimer $Bi_2$,
   means for dissociating the bismuth halide vapor for providing ground state bismuth metal atoms of sufficient number density to create resonance radiation trapping,
   means for creating a population inversion between a desired upper laser level and a lower laser level of the bismuth by exciting ground state bismuth atoms with energized electrons and for maintaining a sufficient number of bismuth atoms in the ground state to preserve said resonance radiation trapping, and
   means for stimulating the emission of a beam of radiation from the inverted medium.

2. In a laser apparatus as claimed in claim 1 wherein said beam of radiation is of a wavelength between 4700 Angstroms and 4800 Angstroms.

3. In a laser apparatus as claimed in claim 1 wherein said beam of radiation is 4722 Angstroms.

4. In a laser apparatus as claimed in claim 1 wherein said upper laser level corresponds to the resonant state and said lower laser level corresponds to the metastable state.

5. In a laser apparatus as claimed in claim 1 wherein said upper laser level is $7s^4P_{1/2}$ and said lower laser level is $6p^3\ ^2D_{3/2}$.

6. In a laser apparatus as claimed in claim 1 wherein the dissociation energy for $BiI_3$ is approximately 2.5 eV and the dissociation energy for $BiBr_3$ and $BiCl_3$ is approximately 3 eV.

7. In a laser apparatus as claimed in claim 1 wherein the vaporizing of $BiI_3$, $BiBr_3$ and $BiCl_3$ produces the gaseous bismuth halide compositions $BiI_3(g)$, $BiBr_3(g)$ and $BiCl_3(g)$ respectively without the formation of the elemental constituents of the respective bismuth halides.

* * * * *